US010069625B2

(12) United States Patent
Chen (10) Patent No.: US 10,069,625 B2
(45) Date of Patent: Sep. 4, 2018

(54) SYSTEM AND METHOD FOR AUTOMATIC KEY GENERATION FOR SELF-ENCRYPTING DRIVES (71) Applicant: Quanta Computer Inc., Taoyuan (TW)

(72) Inventor: Lien-Hsun Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 160 days.

(21) Appl. No.: 14/861,595

(22) Filed: Sep. 22, 2015

(65) Prior Publication Data
US 2017/0085374 A1    Mar. 23, 2017

(51) Int. Cl.
H04L 29/00 (2006.01)
H04L 9/08 (2006.01)

(52) U.S. Cl.
CPC ............ *H04L 9/0827* (2013.01); *H04L 9/083* (2013.01); *H04L 9/0822* (2013.01); *H04L 9/0866* (2013.01); *H04L 9/0894* (2013.01)

(58) Field of Classification Search
CPC .................................................. H04L 9/0827
USPC .......................................................... 380/279
See application file for complete search history.

(56) References Cited

U.S. PATENT DOCUMENTS

| 2014/0025947 | A1  | 1/2014  | Jaber et al. |
| 2014/0351571 | A1* | 11/2014 | Jacobs ................. G06F 21/575 713/2 |
| 2015/0006910 | A1* | 1/2015  | Shapiro ............... G06F 12/1408 713/190 |
| 2015/0086016 | A1  | 3/2015  | Oshida et al. |

FOREIGN PATENT DOCUMENTS

TW    201532417 A    8/2015

OTHER PUBLICATIONS

Taiwanese Office Action for Application No. 104144622 dated Nov. 22, 2016 w/ English First Action Summary.

* cited by examiner

*Primary Examiner* — Brandon Hoffman
*Assistant Examiner* — Michael D Anderson
(74) *Attorney, Agent, or Firm* — Nixon Peabody LLP; Eduardo J. Quiñones (57) ABSTRACT

Embodiments generally relate to data security in a computing system. The present technology discloses techniques that can enable an automatic generation of encryption keys using a service controller in communication with a key management server. By enabling an automatic mechanism for encryption key generation, the present technology can achieve data encryption efficiency for a large number of servers.

20 Claims, 5 Drawing Sheets

SYSTEM AND METHOD FOR AUTOMATIC KEY GENERATION FOR SELF-ENCRYPTING DRIVES

FIELD OF THE INVENTION

The disclosure relates generally to data security in a computing system.

BACKGROUND

Data security technology is becoming more important with the growing popularity of Internet services. As companies and individuals grow reliant on remote data storage, there is a growing demand in data security measures to reduce data breaches or data hacks that can cause irreparable financial and personal damages to the data owners. One important aspect of data security measures is data encryption technology.

Particularly, data encryption technology can include data encryption and data decryption. Data encryption can use an encryption key to transform a clear text to a cipher text, whereas data decryption can transform the cipher text to the clear text.

Hardware-based data encryption technology, such as a self-encrypting drive (SED), can encrypt data as it is written to a storage medium and decrypt the data as it is read from the storage medium. A SED, for example, can use encryption keys to encrypt or decrypt the protected data. However, with the increasing popularity of cloud computing, it remains a challenge to manage the numerous encryption keys for a large number of SEDs in data centers.

SUMMARY

Aspects of the present technology disclose techniques that enable an automatic generation of encryption keys using a service controller in communication with a key management server. By enabling an automatic mechanism for encryption key generation, the present technology can achieve data encryption efficiency for a large number of servers.

According to some embodiments, the present technology discloses a computer-implemented method, comprising: first receiving, at a service controller associated with a computing device, a query for a security key from a self-encrypting drive controller, the query comprising an identifier of a self-encrypting drive, generating a key request for the security key based at least in part on the identifier of the self-encrypting drive controller, first transmitting the key request to a key management server in communication with the service controller, second receiving, in response to the first transmitting, the security key from the key management server; and second transmitting, in response to the second receiving, the security key to the self-encrypting drive controller. Additionally, the service controller can receive a network address of the key management server from a server management device.

According to some embodiments, a service controller, e.g. baseboard management controller (BMC), can communicate with a key management server for automatic encryption key generation via a network (e.g. a local area network). A BMC is an independent and embedded microcontroller that, in some embodiments, is responsible for the management and monitoring of the main central processing unit and peripheral devices on the motherboard. A BMC can communicate with other internal computing components via Intelligent Platform Management Interface (IPMI) messages. A BMC can communicate with external computing devices using Remote Management Control Protocol (RMCP). Alternatively, a BMC can communicate with external devices using RMCP+ for IPMI over LAN. According to some embodiments, a BMC can provide a key request to the key management server via a dedicated interface implemented by a network interface controller of the BMC. Additionally, other service controller, such as a Rack Management Controller (RMC), can communicate with a key management server for automatic encryption key generation.

According to some embodiments, a BMC can transmit the security key (such as an authentication key or a data encryption key) to a storage controller for either unlocking a locked self-encrypting drive or configuring an unlocked self-encrypting drive. For a locked self-encrypting drive, a storage controller can store a cryptographic hash of the authentication key. A cryptographic hash can be created by a hash function that can convert an input string at any length to a fixed-length hash value. After receiving the authentication key from a BMC, the storage controller can create a hash of the received authentication key and compare it with the stored hash of the key. If the two keys match, the self-encrypting drive is unlocked and can read/write like an unencrypted hard disk. For an unlocked self-encrypting drive, the storage controller can configure it with the received authentication key so that the self-encrypting drive can be locked at the next power-off. When the self-encrypting drive is powered on again, it will remain locked until a correct authentication key is provided.

According to some embodiments, a key management server is an external key server that is configured to generate security keys (such as an authentication key or a data encryption key). For example, a key management server can be configured to store an authentication key, retrieve a stored authentication key from a storage medium, adjust the attributes of a stored authentication key and recreate a new authentication key; a key management server can also be configured to store a data encryption key, retrieve a stored data encryption key from a storage medium, adjust the attributes of a stored data encryption key and recreate a new data encryption key.

Although many of the examples herein are described with reference to utilizing a BMC, it should be understood that these are only examples and the present technology is not limited in this regard. Rather, any service controller that is independent from the main central processing unit can be utilized to communicate with the key management server.

Additionally, even though the present disclosure uses a key management server as an example approach of how to automatically generate encryption keys, the present technology is applicable to other key generation device or component that can handle the key request and provide corresponding encryption keys.

Additional features and advantages of the disclosure will be set forth in the description which follows, and, in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Various embodiments or examples ("examples") of the invention are disclosed in the following detailed description and the accompanying drawings.

DETAILED DESCRIPTION

Various embodiments of the present technology are discussed in detail below. While specific implementations are discussed, it should be understood that this is done for illustration purposes only. A person skilled in the relevant art will recognize that other components and configurations may be used without departing from the spirit and scope of the present technology.

To meet growing data security demand, modern data centers require efficient and scalable data encryption technology. As the encryption key is stored in a storage medium independent from the main central processor unit (CPU), a SED provides a reliable cryptography solution to protect user data.

Traditionally, a SED is protected with two levels of encryption keys or passwords: an authentication key can unlock a SED during a booting stage of the encrypted computing device. Once been confirmed, the authentication key can be used to decrypt a secondary key called data encryption key. A data encryption key can be used to encrypt and decrypt user data as it is written to and read from the SED. The authentication key, also called the encryption key, is usually provided by the user. The authentication key can also be provided by a key management server.

For example, during a booting stage of a SED server, a user is required to input an authentication key through a dedicated user interface (UI). Alternatively, a user can configure a SED server to boot into a non-SED operation system and request an authentication key from a key management server. After receiving the authentication key from the key management server, the SED server can unlock the SED and thus allow data to be read/write to the disk.

However, these conventional key generation approaches are time-consuming and difficult to manage. Particularly in the latter approach, booting from an external non-SED drive can expose the SED drive to potential data breach risks. Thus, these conventional approaches are not suitable for the clustered computing environment where a large number of SEDs need to be managed automatically.

Thus, there is a need to provide an automated key generation and management protocol for SEDs that can offer both data security and computing scalability.

Figure 1A:
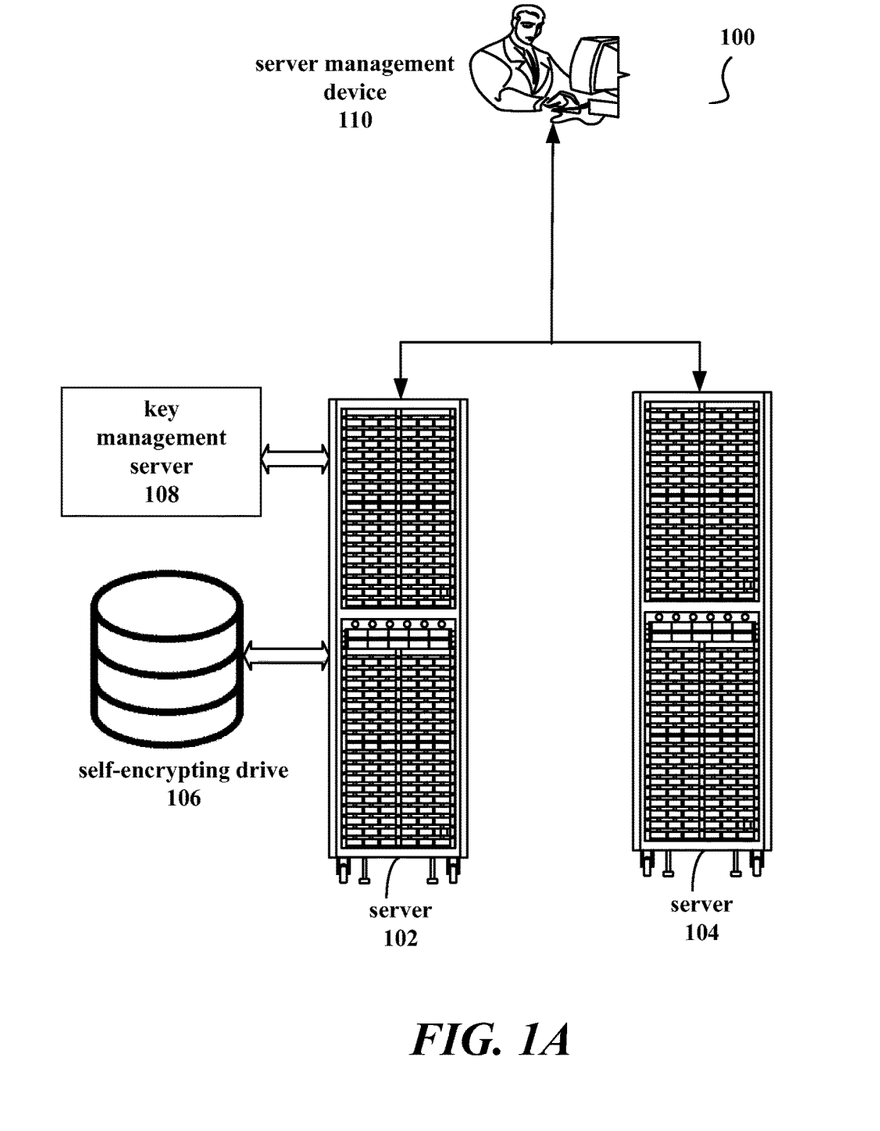
FIG. 1A illustrates an overall system diagram including a server management device, a key management server and a plurality of servers, according to some embodiments.

FIG. 1A illustrates an overall system diagram including a server management device, a key management server and a plurality of servers, according to some embodiments. It should be appreciated that the topology in FIG. 1A is an example, and any numbers of servers, SEDs and network components may be included in the network of FIG. 1.

An automatic encryption key generation system 100 can include a large number of servers that are connected by various network interfaces. For example, the system can include a first rack that includes server 102 and a second rack that can include server 104. According to some embodiments, server 102 can include one or more self-encrypting drive such as self-encrypting drive 106. Additionally, server 102 can include a network interface controller (not shown) for network connection. For purpose of this disclose, server 102 can be any computing device operable to compute and process any form of data. For example, server 102 can be a personal computer, a network storage device, a network computing device. Server 102 can additionally include, for example, various input/output devices such as a display, one or more storage devices such as redundant array of independent disks (RAID), and one or more network interface controllers (NICs). Server 102 can communicate with key management server 108 via a wired network connection such as Ethernet, or a wireless network connection such as a local area network (LAN) or a wide area network.

Servers 102 and 104 can host different client applications, such as email or web applications. Server 102 and 104 can transmit data via layers of switch fabrics that are built into the rack's architecture. This massive data, if left unprotected, can be breached or stolen by unauthorized personnel who can cause substantial loss to the data owners.

An administrator or a user can configure key management server 108 to automatically assign a security key (e.g., an authentication key or a data encryption key) to self-encrypting drive 106. For purpose of this disclosure, key management server 108 can be any computing device or system that can automatically generate, store and provide one or more security keys for the SEDs.

For example, an administrator can use server management device 110 to provide an IP address associated with key management server 108 to a service controller (not shown), which can be located within server 102. For purpose of this disclosure, server management device 110 can be any suitable computing device that can be used by a system administrator to manage a server via a wired or wireless network. For example, server management device 110 can be a personal computer, a tablet, or a web-based system. Server management device 110 can store, in a storage medium, an IP address associated of key management server 108.

Upon each booting process of server 102, the service controller can send a key request to key management server 108 according to the IP address. The key request can include a unique identifier for the requesting self-encrypting drive (e.g., self-encrypting drive 106) that needs to be unlocked. For example, after receiving the key request, key management server 108 can automatically generate an authentication key for self-encrypting drive 106 based on the unique identifier and send the authentication key to the service controller. The service controller can consequently transmit the authentication key to a self-encrypting drive 106 to unlock it. According to some embodiments, a self-encrypting controller (not shown) in communication with self-encrypting drive 106 can receive the authentication key and determine whether it matches with a pre-configured password of self-encrypting drive 106. Additionally, key management server 108 can automatically generate a data encryption key for self-encrypting driver 10-6 based on the unique identifier and send the data encryption key to the service controller.

Additionally, if self-encrypting drive 106 has not been pre-configured with an authentication key, it remains unlocked and functions as a normal disk. In this case, after receiving the authentication key from the service controller, self-encrypting drive 106 can configure itself with the authentication key so that it can be locked for the next reboot.

According to some embodiments, after receiving the key request, key management server 108 can automatically generate a data encryption key for self-encrypting drive 106 based on the unique identifier and send the authentication key to the service controller. The service controller can consequently transmit the data encryption key to a self-encrypting drive 106 for data encryption. According to some embodiments, a self-encrypting controller (not shown) in communication with self-encrypting drive 106 can receive the data encryption key and determine whether it matches with a pre-configured data encryption key of self-encrypting drive 106.

Figure 1B:
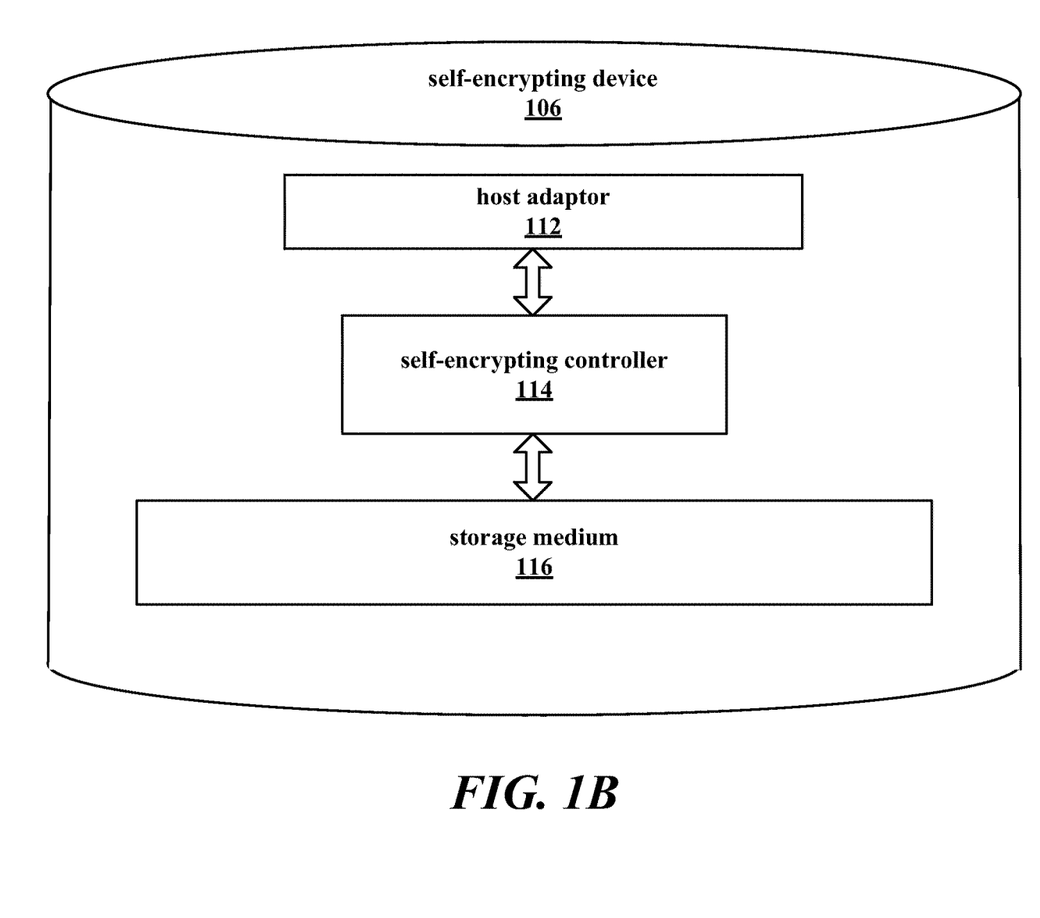
FIG. 1B illustrates a schematic block diagram illustrating an example of a self-encrypting drive, according to some embodiments.

FIG. 1B illustrates a schematic block diagram illustrating an example of a self-encrypting drive, according to some embodiments. Self-encrypting device 106 can include, but not limited to, host adaptor 112, self-encrypting controller 114 and storage medium 116. Host adaptor 112 can provide host interfaces such as such as Serial ATA Express (SATA), Serial-attached SCSI (SAS), SAS or Peripheral Component Interconnect Express (PCIe). Self-encrypting controller 114 can be any sort of processors embedded to execute self-encrypting functions disclosed herein. Storage medium 116 can be can be any storage medium configured to store program instructions or data for a period of time. For example, storage medium 116 can be a flash drive, a solid-state drive (SSD), a hard-disk drive (HDD), or a combination thereof.

As described with respect to FIG. 1A, self-encrypting controller 114 can receive a primary key, e.g. an authentication key, from a service controller to unlock the data read/write function to storage medium 116. According to some embodiments, self-encrypting controller 114 can verify the received authentication key with a stored password associated with self-encrypting drive 106. According to some embodiments, self-encrypting controller 114 can create a hash of the received authentication key and compare it with a stored hash of the key or password. If the authentication key is verified successfully, self-encrypting drive 106 can be unlocked and continue with the data write/read function similar to a normal hard drive.

For example, in a data write path of self-encrypting device 106, self-encrypting controller 114 can receive clear text data from a host interface that can be implemented by host adaptor 112. As the data is written to storage medium 116, self-encrypting controller can encrypt the clear text into the cipher text with a secondary key called a data encryption key. Conversely, in a data read path, self-encrypting controller 116 can decrypt the cipher text using the same data encryption and generate the clear text data.

According to some embodiments, the data encryption key can, for example, be generated by self-encrypting device 106 and stored locally in the drive. An encrypted format of the data encryption key can be stored in self-encrypting device 106, which can be deciphered using the primary key or the authentication key. Additionally, erasing the data encryption key can render all encrypted data unreadable, thus providing a complete and irreversible deletion of the encrypted data.

According to some embodiments, the data encryption key can, for example, be generated by key management server 108 and received by a BMC (not shown) associated with self-encrypting device 106.

Figure 2:
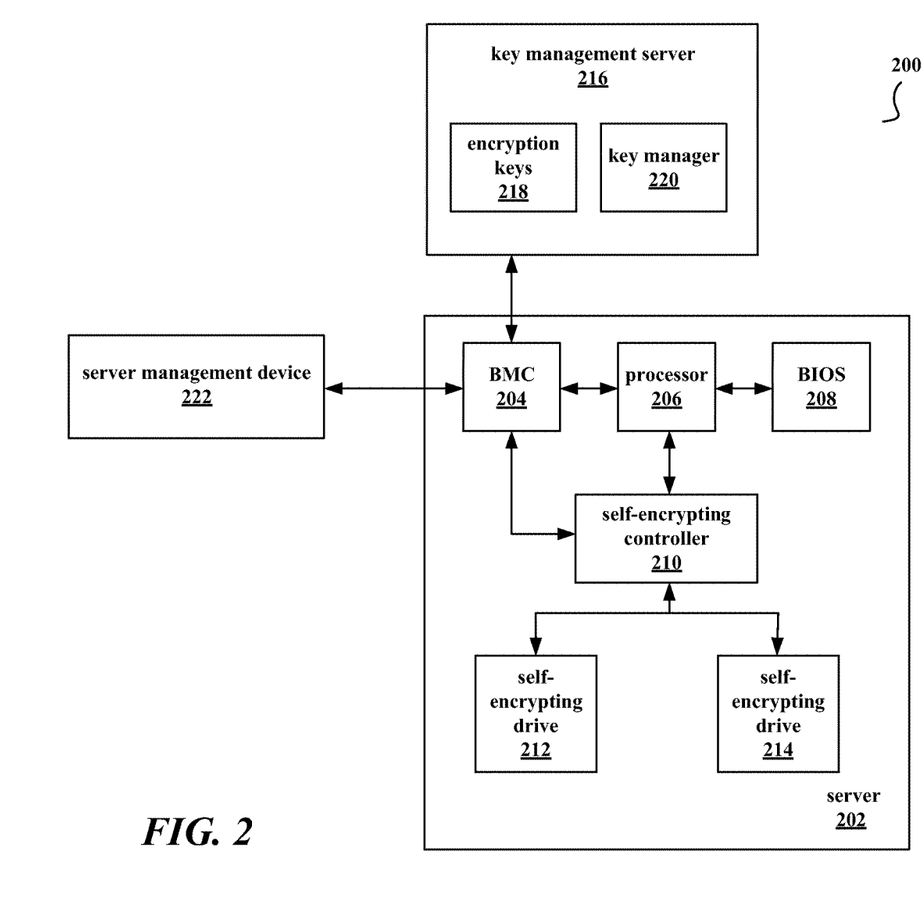
FIG. 2 is a schematic block diagram illustrating an example of an automatic encryption key generation system, according to some embodiments.

FIG. 2 is a schematic block diagram illustrating an example of an automatic encryption key generation system, according to some embodiments. An automatic encryption key generation system 200 can include, for example, server management device 222, server 202 and key management server 216. Server 202 can communicate with key management device 216 and server management device 222 via a wired connection such as Ethernet, or a wireless connection such as a local area network (LAN) or a wide area network.

As illustrated in FIG. 2, server 202 can include a plurality of self-encrypting drives, e.g., self-encrypting drive 212 and self-encrypting drive 214, BMC 204 (baseboard management controller), a processor 206 (e.g., a central processing unit), BIOS 208 (basic input/output operation system), and at least one storage controller 210 that can be configured to manage self-encrypting drive 212 or self-encrypting drive 214.

Self-encrypting drive 212 can be a hard drive or a storage medium with a self-encrypting controller that can encrypt and decrypt user data. Each self-encrypting drive can be associated with a unique identifier, such as a globally unique identifier (GUID) or a universally unique identifier (UUID). A GUID can have a 128-bit value and be displayed as 32 hexadecimal digits with hyphen-separated groups, e.g., 3AEC1226-BA34-4069-CD45-12007C340981. A UUID can also have a 128-bit value and be displayed in a format that is similar to a GUID. Additionally, self-encrypting drive 212 can be divided into multiple logic units, each of which is assigned a unique logic unit number (LUN). According to some embodiments, a selected logic unit of self-encrypting drive 212 can be encrypted and the rest of logic units can remain unencrypted.

Processor 206 can be a central processing unit (CPU) that is configured to execute BIOS 208 and various program instructions for specific functions. For example, processor 206 can execute BIOS 208 during an initiation process, e.g., a booting process, of server 202. BIOS 208 can be any program instructions or firmware configured to initiate and identify various components of server 202, including device such as a keyboard, a display, a data storage, and other input or output devices. BIOS 208 can be stored in a BIOS memory (not shown) and be accessed by processor 206 during a booting process.

During the booting process, if self-encrypting drive 212 is locked with an authentication key, BIOS 208 can identify a shadow disk that is much smaller than an actually self-encrypting drive (e.g., self-encrypting drive 212). The shadow disk can require an authentication key be entered to unlock the actual self-encrypting drive. The authentication key can also be used to decrypt a data encryption key. If the system provides the correct authentication key, processor 206 can execute BIOS 208 for a second time to start from the actual self-encrypting drive. (e.g., self-encrypting drive 212) and self-encrypting drive 212 can be accessed like a regular disk.

BMC 204 is an independent and embedded microcontroller that, in some embodiments, is responsible for the management and monitoring of the main central processing unit (e.g., processor 206) and peripheral devices on the motherboard (e.g., switches, computing nodes and storage nodes). According to some embodiments, BMC 204 can communicate with server management device 222 via a dedicated network interface (e.g., a LAN) implemented by an associated network interface controller (not shown). BMC 204 can also communicate with key management device 216 via a dedicated LAN. BMC 204 can communicate with processor 206 or self-encrypting controller 210 via Intelligent Platform Management Interface (IPMI) messages by using a system bus called Intelligent Platform Management Bus/Bridge (IPMB). As an enhanced implementation of inter-integrated circuit (I²C) bus, IPMB is a message-based, hardware-level basic interface specification. It is authentication-free since it is intended for trusted internal communications. According to some embodiments, BMC 204 can execute a key management program (not shown) to request, receive and transmit the authentication keys for self-encrypting drive 212 and 214. Additionally, it should be noted other types of service controllers that are independent from a main central processing unit, e.g., a rack management controller, can be used to perform functions disclosed herein.

According to some embodiments, server management device 222 can provide an IP address of key management server 216 to BMC 204 over LAN. For example, a server administrator can issue a command through a user interface of server management device 222 to send an IP address of key management server 216 to BMC 204. BMC 204 can request an authentication key to the key management server 216 according to the IP address.

During an initiation process of server 202, BMC 204 can receive a query for an authentication key from storage controller 210. The query can, for example, include a unique identifier associated with self-encrypting device 212. An example of the unique identifier can include a globally unique identifier (GUID) or a universally unique identifier (UUID). For example, a GUID of self-encrypting drive 212 can be 1ACD1226-BA34-4069-CD45-12007C340981. Additionally, a LUN of self-encrypting drive 212 can be associated with the query for identifying a logic unit number of the storage medium.

After receiving the query for the authentication key, BMC 204 can, based on the unique identifier of self-encrypting drive 212 and the IP address of key management server 216, generate a key request. For example, the format of the key request can conform to Key Management Interoperability Protocol (KMIP). KMIP is a communication protocol that can define message format for cryptographic key management using a key management server. Additionally, other suitable communication protocols such as XML Key Management Specification (XKMS) can be utilized in some embodiments of the present technology. For example, the key request can include a request header, a command section for key request, and a unique identifier associated with self-encrypting drive 212. BMC 204 can transmit the key request to key management server 216, using the IP address of key management server 216. Additionally, BMC 204 can communicate with key management server 216 using Remote Management Control Protocol (RMCP) or RMCP+ for IPMI over LAN. Additionally, BMC 204 can generate a status message reporting a status of the key generation or retrieval process. For example, BMC 204 can generate a first status message indicating an initiation of the key generation/retrieval process for storage controller 210. According to some embodiments, BMC 204 can generate a first status message and transmit it to storage controller 210 in response to a first status request from service controller 210.

Key management server 216 can be an external key server that is configured to generate and manage encryption keys 218 using, for example, key manager 220. Key management server 216 can also be configured to store encryption keys 218 in a storage medium such as a hard disk. Encryption keys 218 can include authentication keys and data encryption keys. According to some embodiments, key management server 216 can receive the key request from BMC 204. Other functions key server management 216 can perform include, for example, retrieving a stored authentication key from a storage medium, adjusting the attributes of a stored authentication key and recreating a new authentication key.

In response to receiving the key request, key management server 216 can identify the unique identifier in the key request and determine whether an authentication key has been created and stored for self-encrypting drive 212. If an authentication key has been previously created and stored for self-encrypting drive 212, key manager 220 can retrieve the corresponding encryption key and send it to BMC 204 in a key response. A format of the key response can conform to KMIP. For example, the key response can include a response header, a key value (e.g., a 256-bit encryption key), and the unique identifier associated with self-encrypting drive 212. On the other hand, if no authentication key has been created for self-encrypting drive 212, key management server 216 can create an authentication key based on the unique identifier and store it in a storage medium.

According to some embodiments, BMC 204 can issue a key generation command to key management server 216. After creating the authentication key, key management server 216 can respond to BMC 204 with a key response as described herein. Additionally, BMC 204 can generate a second status message to storage controller 210 that can indicate the key generation/retrieval process is on-going. According to some embodiments, BMC 204 can generate a second status message and transmit it to storage controller 210 in response to a second status request from service controller 210.

After receiving the authentication key from key management server 216, BMC 204 can transmit the authentication key to storage controller 210 for either unlocking a locked self-encrypting drive 212 or configuring an unlocked self-encrypting drive 212, as disclosed as following. Additionally, BMC 204 can generate a third status message to storage controller 210 indicating the key is ready. According to some embodiments, BMC 204 can generate a third status message and transmit it to storage controller 210 in response to a third status request from service controller 210.

When self-encrypting drive 212 is locked by an authentication key, storage controller 210 can store a cryptographic hash of the authentication key. During the initiation process, after receiving the authentication key from BMC 204, storage controller 210 can create a hash of the received authentication key and compare it with the stored hash of the key. If the two keys or passwords match, the self-encrypting drive is unlocked and can read/write like an unencrypted hard disk. Further, the matched authentication key can also decrypt the data encryption key, which can be used to encrypt and decrypt the user data, as described earlier in the specification.

When self-encrypting drive 212 is unlocked, storage controller 210 can configure it with the received authentication key. At the next power-off, self-encrypting drive 212 can lock itself with the authentication key. When self-encrypting drive 212 is powered on again, it will remain locked until a correct authentication key is provided.

Figure 3:
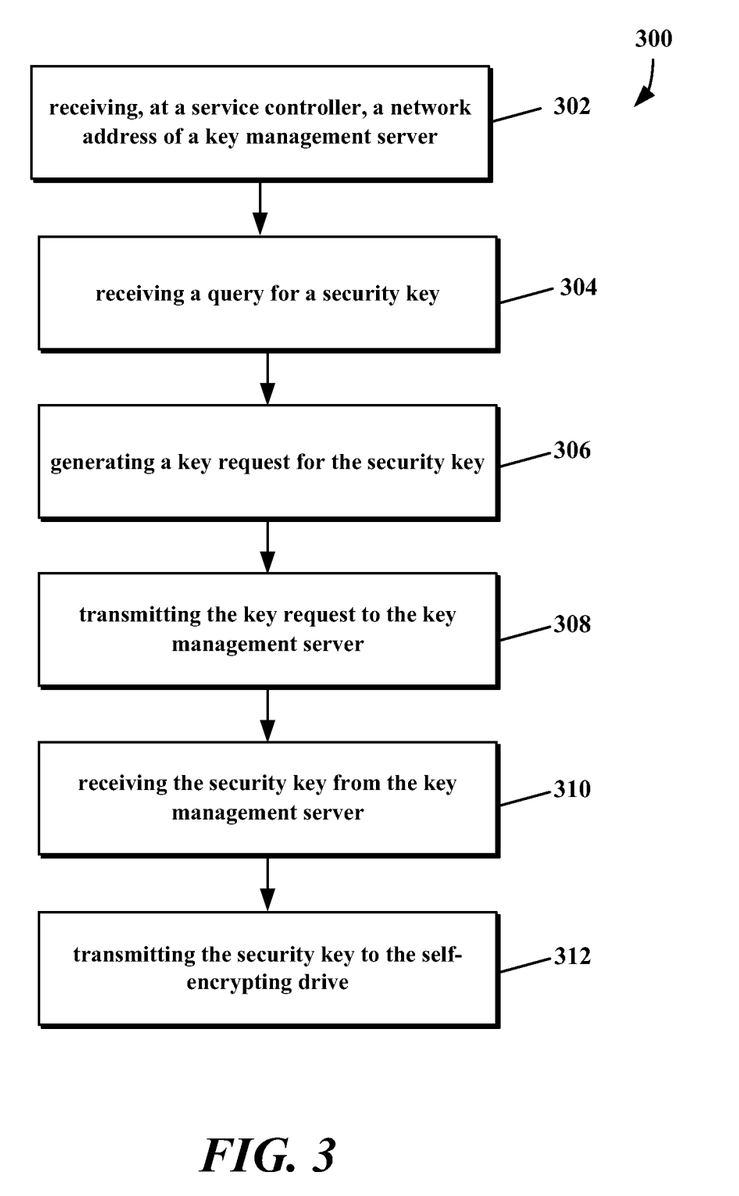
FIG. 3 is an example flow diagram for an automatic encryption key generation system, according to some embodiments.

FIG. 3 is an example flow diagram for an automatic encryption key generation system, according to some embodiments, according to some embodiments. It should be understood that there can be additional, fewer, or alternative steps performed in similar or alternative orders, or in parallel, within the scope of the various embodiments unless otherwise stated.

At step 302, a server administrator can configure a service controller with a network address of a key management server. For example, with reference to FIG. 2, a server administrator can use server management device 222 to provide an IP address of key management server 216 to BMC 204 over LAN. BMC 204 can execute a key management program (not shown) to request, receive and transmit the authentication keys for self-encrypting drive 212 and 214.

At step 304, the service controller can receive a query for a security key from a storage controller. A security key can be an authentication key. For example, during an initiation process of server 202, BMC 204 can receive a query for an authentication key from storage controller 210. The query can, for example, include a unique identifier associated with self-encrypting device 212. An example of the unique identifier can include a globally unique identifier (GUID) or a universally unique identifier (UUID).

At step 306, the service controller can generate a key request for the security key based at least in part on the identifier of the self-encrypting drive. For example, BMC 204 can, based on the unique identifier of self-encrypting drive 212 and the IP address of key management server 216, generate a key request. The format of the key request can conform to KMIP. The key request can include a request header, a command section for key request, and a unique identifier associated with self-encrypting drive 212.

At step 308, the service controller can transmit the key request to a key management server in communication with the service controller. For example, BMC 204 can transmit the key request to key management server 216, using the IP address of key management server 216. BMC 204 can communicate with key management server 216 using Remote Management Control Protocol (RMCP) or RMCP+ for IPMI over LAN.

Still referring to FIG. 2, key management server 216 can be an external key server that is configured to manage authentication keys 218 using key manager 220. Key management server 216 can also be configured to store encryption keys 218 in a storage medium such as a hard disk. Other functions key server management 216 can perform include, for example, retrieving a stored authentication key from a storage medium, adjusting the attributes of a stored authentication key and recreating a new authentication key.

In response to receiving the key request, key management server 216 can identify the unique identifier in the key request and determine whether an authentication key has been created and stored for self-encrypting drive 212. If an authentication key has been previously created and stored for self-encrypting drive 212, key manager 220 can retrieve the corresponding authentication key and send it to BMC 204 in a key response. A format of the key response can conform to KMIP. For example, the key response can include a response header, a key value (e.g. a 256-bit encryption key), and the unique identifier associated with self-encrypting drive 212. On the other hand, if no authentication key has been created for self-encrypting drive 212, key management server 216 can create an authentication key based on the unique identifier and store it in a storage medium. According to some embodiments, BMC 204 can issue a key generation command to key management server 216. After creating the authentication key, key management server 216 can respond to BMC 204 with a key response as described herein.

At step 310, the service controller can receive the security key from the key management server. For example, BMC 204 can receive the key response from key management server 216 using Remote Management Control Protocol (RMCP) or RMCP+ for IPMI over LAN.

At step 312, the service controller can transmit the security key to the self-encrypting drive controller. For example, BMC 204 can transmit the authentication key to storage controller 210 for either unlocking a locked self-encrypting drive 212 or configuring an unlocked self-encrypting drive 212. Additionally, the authentication key can be used decrypt the data encryption key associated with self-encrypting drive 212.

When self-encrypting drive 212 is locked, storage controller 210 can store a cryptographic hash of the authentication key. After receiving the authentication key from BMC 204, storage controller 210 can create a hash of the received authentication key and compare it with the stored hash of the key. If the two keys or passwords match, self-encrypting drive is unlocked and can read/write like an unencrypted hard disk. Further, the matched authentication key can also decrypt the data encryption key, which can be used to encrypt and decrypt the user data, as described herein.

When self-encrypting drive 212 is unlocked, storage controller 210 can configure it with the received authentication key so that self-encrypting drive 212 can lock itself at the next shut-down. When self-encrypting drive 212 is powered on again, it will remain locked until a correct authentication key is provided.

Figure 4:
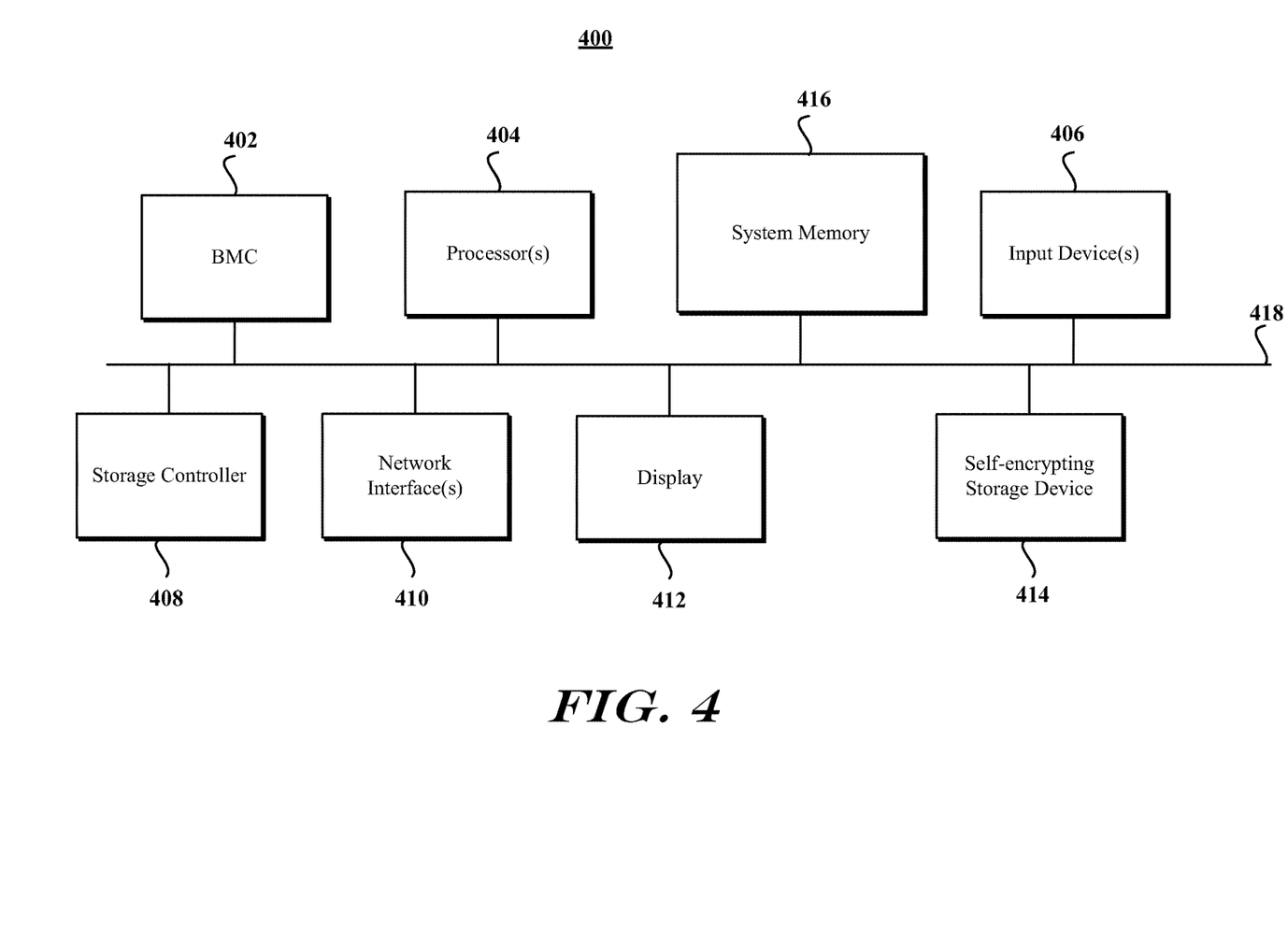
FIG. 4 illustrates a computing platform of a computing device, according to some embodiments.

FIG. 4 illustrates an example system architecture 400 for implementing the systems and processes of FIGS. 1-3. Computing platform 400 includes a bus 418 which interconnects subsystems and devices, such as: BMC 402, processor 404, system memory 416, input device 406, storage controller 408, a network interface(s) 410, display 412, and self-encrypting storage device 414. Processor 404 can be implemented with one or more central processing units ("CPUs"), such as those manufactured by Intel® Corporation—or one or more virtual processors—as well as any combination of CPUs and virtual processors. Computing platform 400 exchanges data representing inputs and outputs via input-and-output devices input devices 406 and display 412, including, but not limited to: keyboards, mice, audio inputs (e.g., speech-to-text devices), user interfaces, displays, monitors, cursors, touch-sensitive displays, LCD or LED displays, and other I/O-related devices.

According to some examples, computing architecture 400 performs specific operations by processor 404, executing one or more sequences of one or more instructions stored in system memory 416. Computing platform 400 can be implemented as a server device or client device in a client-server arrangement, peer-to-peer arrangement, or as any mobile computing device, including smart phones and the like. Such instructions or data may be read into system memory 416 from another computer readable medium, such as a storage device. In some examples, hard-wired circuitry may be used in place of or in combination with software instructions for implementation. Instructions may be embedded in software or firmware. The term "computer readable medium" refers to any tangible medium that participates in providing instructions to processor 404 for execution. Such a medium may take many forms, including, but not limited to, non-volatile media and volatile media. Non-volatile media includes, for example, optical or magnetic disks and the like. Volatile media includes dynamic memory, such as system memory 416.

Common forms of computer readable media includes, for example: floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 418 for transmitting a computer data signal.

In the example shown, system memory 416 can include various software programs that include executable instructions to implement functionalities described herein. In the example shown, system memory 416 includes a log manager, a log buffer, or a log repository—each can be configured to provide one or more functions described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A computer-implemented method, comprising:
   first receiving, at a service controller associated with a computing device, a query for a security key from a self-encrypting drive controller, the query comprising an identifier of a self-encrypting drive;
   generating, at the service controller, a key request for the security key based at least in part on the identifier of the self-encrypting drive, the key request containing information of the identifier of the self-encrypting drive;
   first transmitting the key request to a key management server in communication with the service controller, wherein the key management server is operable to identify whether an authentication key has been created and stored for the self-encrypting drive based upon the key request, and generate the authentication key for the self-encrypting drive if no authentication key is retrieved;
   second receiving, at the service controller, in response to the first transmitting, the security key from the key management server; and
   second transmitting, in response to the second receiving, the security key to the self-encrypting drive controller.

2. The computer-implemented method of claim 1, further comprising:
   receiving, at the service controller associated with the computing device, a network address associated with the key management server.

3. The computer-implemented method of claim 1, wherein the self-encrypting drive controller is configured to unlock the self-encrypting drive using the security key.

4. The computer-implemented method of claim 1, wherein the self-encrypting drive controller is configured to configure the self-encrypting drive to be associated with the security key.

5. The computer-implemented method of claim 1, wherein the self-encrypting drive controller is configured to create a hash of the security key and compare the hash of the security key with a stored hash of a pre-configured security key.

6. The computer-implemented method of claim 1, wherein the service controller is a baseboard management controller.

7. The computer-implemented method of claim 1, wherein the security key is configured to perform, at least one of, unlocking the self-encrypting drive or decrypting a data encryption key stored in the self-encrypting drive.

8. The computer-implemented method of claim 1, wherein the security key is a data encryption key.

9. A system, comprising:
   a processor; and
   a memory including instructions that, if executed by the system, cause the system to:
   first receive, at a service controller associated with a computing device, a query for a security key from a self-encrypting drive controller; the query comprising an identifier of a self-encrypting drive;
   generate, at the service controller, a key request for the security key based at least in part on the identifier of the self-encrypting drive, the key request containing information of the identifier of the self-encrypting drive;
   first transmit the key request to a key management server in communication with the service controller first transmitting the key request to a key management server in communication with the service controller, wherein the key management server is operable to identify whether an authentication key has been created and stored for the self-encrypting drive based upon the key request, and generate the authentication key for the self-encrypting drive if no authentication key is retrieved;
   second receive, at the service controller, in response to the first transmit, the security key from the key management server; and
   second transmit, in response to the second receive, the security key to the self-encrypting drive controller.

10. The system of claim 9, wherein the instructions when executed further cause the system to:
    receive, at the service controller associated with the computing device, a network address associated with the key management server.

11. The system of claim 9, wherein the self-encrypting drive controller is configured to, at least one of, unlocking the self-encrypting drive using the security key or configuring the self-encrypting drive to be associated with the security key.

12. The system of claim 9, wherein the self-encrypting drive controller is configured to create a hash of the security key and compare the hash of the security key with a stored hash of a pre-configured security key.

13. The system of claim 9, wherein the service controller is a baseboard management controller.

14. The system of claim 9, wherein the security key is configured to perform, at least one of, unlocking the self-encrypting drive or decrypting a data encryption key stored in the self-encrypting drive.

15. The system of claim 9, wherein the identifier comprises at least one of a universally unique identifier or a globally unique identifier.

16. A computer program stored on a non-transitory computer-readable storage medium, the computer program comprising:
    code for first receiving, at a service controller associated with a computing device, a query for a security key from a self-encrypting drive controller; the query comprising an identifier of a self-encrypting drive;
    code for first generating, at the service controller, a key request for the security key based at least in part on the identifier of the self-encrypting drive, the key request containing information of the identifier of the self-encrypting drive;
    code for transmitting the key request to a key management server in communication with the service controller, wherein the key management server is operable to identify whether an authentication key has been created and stored for the self-encrypting drive based upon the key request, and generate the authentication key for the self-encrypting drive if no authentication key is retrieved;

code for second receiving, at the service controller, in response to the first transmitting, the security key from the key management server; and code for second transmitting, in response to the second receiving, the security key to the self-encrypting drive controller.

17. The computer program of claim 16, further comprising:

code for receiving, at the service controller associated with the computing device, a network address associated with the key management server.

18. The computer program of claim 16, wherein the self-encrypting drive controller is configured to, at least one of, unlocking the self-encrypting drive using the security key or configuring the self-encrypting drive to be associated with the security key.

19. The computer program of claim 16, wherein the self-encrypting drive controller is configured to create a hash of the security key and compare the hash of the security key with a stored hash of a pre-configured security key.

20. The computer program of claim 16, wherein the security key is configured to perform, at least one of, unlocking the self-encrypting drive or decrypting a data encryption key stored in the self-encrypting drive.

* * * * *